No. 675,608. Patented June 4, 1901.
N. NELSON.
SPEED REGULATOR.
(Application filed Jan. 23, 1901.)
(No Model.)
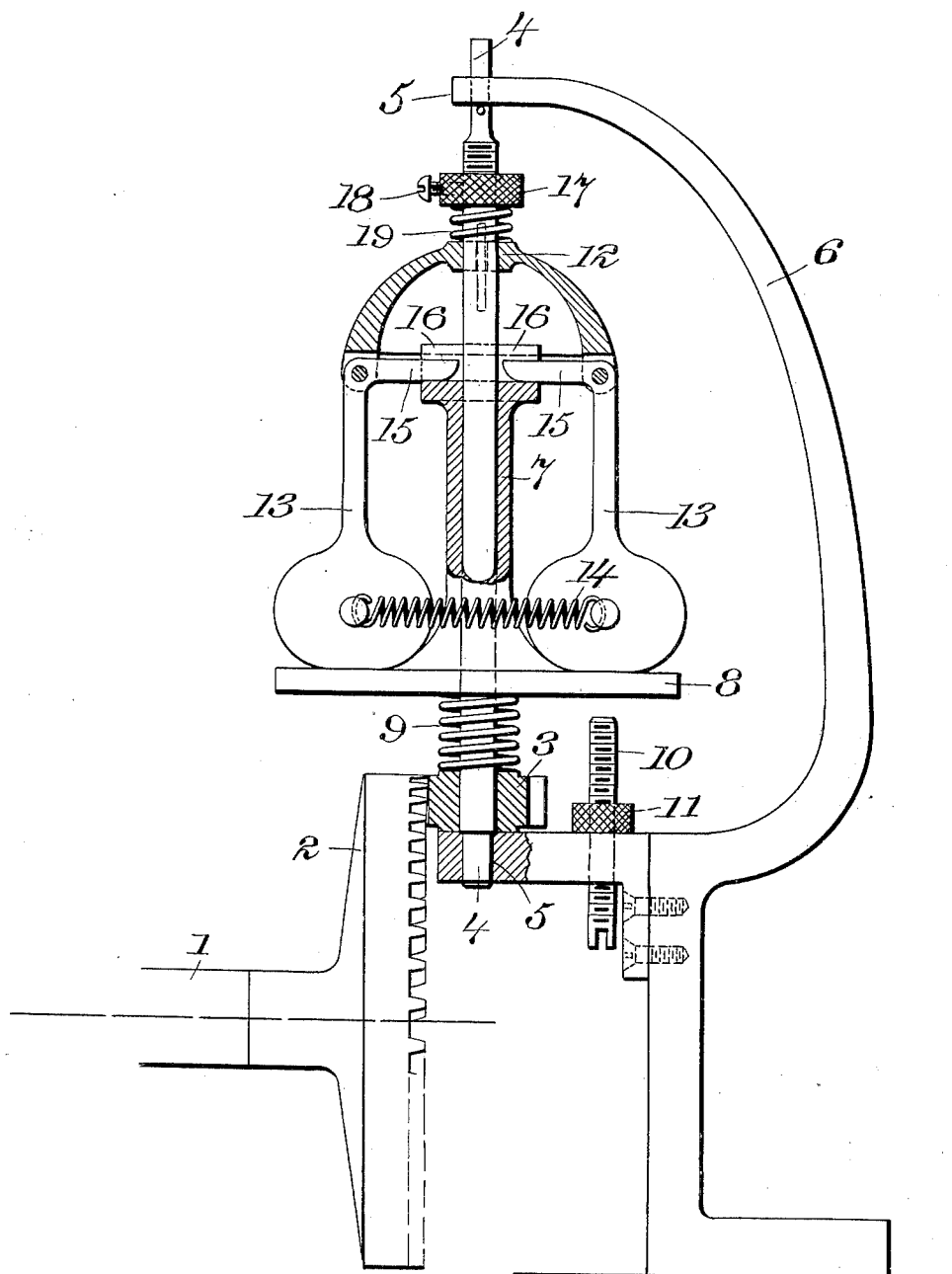
WITNESSES:
INVENTOR
Nicolay Nelson
BY
ATTORNEY
THE NORRIS PETERS CO., PHOTO-LITHO., WASHINGTON, D. C.

UNITED STATES PATENT OFFICE.

NICOLAY NELSON, OF WAUKEGAN, ILLINOIS, ASSIGNOR TO LE ROY W. BALDWIN, OF NEW YORK, N. Y.

SPEED-REGULATOR.

SPECIFICATION forming part of Letters Patent No. 675,608, dated June 4, 1901.

Original application filed June 6, 1899, Serial No. 719,564. Divided and this application filed January 23, 1901. Serial No. 44,404. (No model.)

*To all whom it may concern:*

Be it known that I, NICOLAY NELSON, a citizen of the United States of America, and a resident of Waukegan, county of Lake, State of Illinois, have invented certain new and useful Improvements in Speed-Regulators, of which the following is a specification.

This invention relates generally to speed-regulators, being a division of my application filed June 6, 1899, Serial No. 719,564, and is more specifically designed to produce a governor and a brake adapted to coöperate in preventing the rotation of a shaft or like revolving part beyond a predetermined speed.

I have illustrated the preferred form of mechanism embodying my invention in the accompanying sheet of drawing by a view in elevation, there being certain portions represented in section to more clearly show the construction and relation of the parts.

Referring to the drawing, 1 may represent the shaft or other revolving element mounted to be driven from any suitable source of power at a speed to be regulated. Motion from this shaft may be transmitted to the governor-shaft through the crown-gear 2 and pinion 3 or in any other well-known manner, as the gearing referred to is employed here merely to serve in completing an operative illustration.

The governor-shaft 4 is mounted to rotate freely in bearings 5 5 of a bracket 6. These bearings may be separate, if desired, and carried by individual brackets, or the shaft may be otherwise mounted in any well-known manner. A sleeve 7, loosely mounted upon the governor-shaft and sliding endwise thereon, terminates at its lower end or has secured thereto a friction disk or flange 8, which latter seats upon a helical spring 9, encircling that portion of the shaft between the disk and pinion, and is yieldingly supported thereby above and clear of a stationary contact-point 10. This point 10, as shown, is formed by a vertical post threaded in an opening of the bracket and is adjustable toward and away from the friction-disk. A nut 11 upon the post serves to lock the same in any position to which it is adjusted.

Upon the governor-shaft above the sleeve a collar 12 is splined and carries pivoted to it the weighted governor-arms 13 13, which are connected upon opposite sides by light springs 14 14. The arms are provided with right-angular lugs or extensions 15 15, which project inwardly and enter notches 16 16, formed in the upper end of the sleeve. Thus arranged the shaft, collar, and sleeve rotate together, and the two last-mentioned parts—*i. e.*, the collar and sleeve—in addition to their rotary motion have an endwise movement toward and away from each other. Above the collar the shaft is threaded to receive a nut 17, which is adjustably locked thereon by a set-screw 18. A spring 19, encircling that portion of the shaft between the nut and collar, tends to force the latter downward and at the same time provides a cushioned bearing for the same when the governor is in action. By shifting the nut above the spring the tension of the latter may be varied as desired.

The operation is as follows: The gearing described transmits motion from the shaft or other revolving element, the rotation of which is not to exceed a determined speed, to the governor-shaft, and the sleeve and collar thereon connected through the weighted arms are caused to rotate with the shaft by being splined thereon, as above described. As the speed of rotation increases the weighted arms separate or tend to fly outward, and the lugs 15 15, in engagement with the notched sleeve, force the same downward in opposition to the spring 9. Before the speed becomes excessive or increases beyond a predetermined limit the revolving friction-disk upon the lower end of the sleeve will be forced into engagement with the stationary contact point or post 10, and the latter, acting as a drag or brake, will prevent the apparatus to be controlled from racing or running away as the load varies. As shown, the weighted arms in flying outward first overcome the resistance of their connecting-springs, as well as the upper and lower springs 19 and 9, which latter, acting in opposite directions, force the collar and sleeve together. This arrangement is designed particularly to serve in regulating mechanism operating intermittently at a comparatively high speed and in which the load may vary more or less, as in the weighing and weight-printing machine disclosed in my application above referred to. By adjusting the post 10 toward or away from the friction-disk the governor may be set to control the speed of rotation as may be desired.

It will be understood that I do not wish to limit myself to the exact form and arrangement of parts herein illustrated and described, as various changes might be made without departing from the spirit and scope of my invention. Other forms of sleeve might be employed and the stationary contact-point caused to engage therewith in a different manner. Other forms of the collar and attached weighted arms might be substituted for those parts shown, and the weighted arms might be differently arranged to engage the sleeve; but all such changes I consider obvious variations of form and not of substance and still within the meaning of the present invention.

Having therefore described my invention, I claim—

The combination of the governor-shaft, the sleeve and friction-disk sliding lengthwise thereof, the stationary contact-point against which the friction-disk may rub, the collar sliding lengthwise of the shaft, the governor-arms pivoted to said collar and engaging with the sleeve, so as to normally force the sleeve and collar apart under centrifugal action and thereby force the disk against the friction-point and the springs normally forcing said sleeve and collar together.

Signed at Waukegan, Illinois, this 16th day of January, 1901.

NICOLAY NELSON.

Witnesses:
ELVIN J. GRIFFIN,
E. J. HEYDECKER.